UNITED STATES PATENT OFFICE.

NEW YORK IMPROVED ANTHRACITE COAL COMPANY, OF NEW YORK, N. Y., ASSIGNEE OF EDWARD J. DE SMEDT.

ASPHALT ROAD AND PAVEMENT

SPECIFICATION forming part of Reissued Letters Patent No. 9,325, dated July 27, 1880.

Original No. 103,582, dated May 31, 1870. Application for reissue filed July 6. 1880.

*To all whom it may concern:*

Be it known that EDWARD JOSEPH DE SMEDT, of the city, county, and State of New York, assignor to the NEW YORK IMPROVED ANTRACITE COAL COMPANY, invented a new and useful Improvement in Asphalt Roads and Pavements; and he hereby declares that the following is a full, clear, and exact description of the same.

This invention has for its object to overcome the difficulty attending the construction of asphalt roads and pavements as regards the proper laying of the asphalt and the rendering of the same competent to bear exposure in our climate, especially the high temperature of summer months.

Many asphalts are difficult to melt and spread evenly on a road-surface, and to remedy this he added a certain quantity of heavy petroleum-oil, or the residium of the same, which will not volatilize at an ordinary temperature, to the asphalt; and he also added a quantity of the substances known as "Ritchie mineral" and "Albertite," either or both, (powdered,) the latter in a short time absorbing the excess of the petroleum-oil and causing the asphalt to harden shortly after being laid.

The manner of preparing, treating, and laying the asphalt mass is as follows: He took asphalt, one hundred and twenty-five parts; petroleum-oil, twenty-five parts. These substances were melted and thoroughly incorporated together, and to this mixture he added, in a heated state, sand or powdered stone, seven hundred and fifty parts, and gravel or broken stone, also heated, eleven hundred parts. The whole was then thoroughly mixed, and from five to fifty parts of Ritchie mineral or Albertite, in a powdered state, was added to the mass.

The Ritchie mineral or Albertite was simply mixed with the mass, time not being allowed for it to dissolve, the mass being immediately applied to the road-surface after the Ritchie mineral was added, and the latter soon absorbed the excess of petroleum-oil, and the mass rapidly hardened, and was rendered capable of withstanding the heat of our summer months.

It is to be distinctly understood that by the term "asphalt" is meant the natural substance so called by chemists and geologists, and not any of the products of the distillation of bituminous coal, which of late years have been popularly, but incorrectly, thus termed.

What we claim as new, and desire to secure by Letters Patent, is—

In a compound for concrete pavements or other analagous uses, the combination of natural asphalt and petroleum-oil, or the residuum of the same, with sand or powdered stone, or both, and with or without Ritchie mineral or Albertite.

NEW YORK IMPROVED ANTHRACITE COAL CO.,
BY A. L. BARBER, *President.* [L. S.]

Witnesses:
JAMES MCLAIN,
JOSEPH PAUL.